United States Patent
Kato et al.

(10) Patent No.: US 12,157,582 B2
(45) Date of Patent: Dec. 3, 2024

(54) OBSERVATION CONTROL DEVICE AND SPACECRAFT, OBSERVATION CONTROL METHOD, AND OBSERVATION CONTROL PROGRAM

(71) Applicant: MITSUBISHI HEAVY INDUSTRIES, LTD., Tokyo (JP)

(72) Inventors: Masahiro Kato, Tokyo (JP); Takahiro Yamada, Tokyo (JP); Kazunori Masukawa, Tokyo (JP); Kenichiro Kawabata, Tokyo (JP); Keisuke Ando, Tokyo (JP); Hiroshi Kawato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 290 days.

(21) Appl. No.: 17/103,303

(22) Filed: Nov. 24, 2020

(65) Prior Publication Data
US 2021/0163154 A1 Jun. 3, 2021

(30) Foreign Application Priority Data

Nov. 29, 2019 (JP) .................. 2019-216710
Nov. 11, 2020 (JP) .................. 2020-187789

(51) Int. Cl.
*B64G 1/10* (2006.01)
*B23Q 17/24* (2006.01)
*H04N 1/00* (2006.01)

(52) U.S. Cl.
CPC ....... *B64G 1/1021* (2013.01); *B23Q 17/2404* (2013.01); *B64G 1/1028* (2023.08); *B23Q 17/2409* (2013.01); *G06T 2207/30181* (2013.01); *H04N 1/00042* (2013.01)

(58) Field of Classification Search
CPC .......... B64G 1/1021; B64G 2001/1028; B23Q 17/24; B23Q 17/2414; B23Q 17/2419; B23Q 17/2404; G06T 2207/30181; H04N 1/00042
USPC ........ 701/13, 531; 244/158.6; 348/144, 145, 348/146, 208; 359/429; 382/113, 165, 382/170, 171, 173, 180, 190–206
See application file for complete search history.

(56) References Cited

U.S. PATENT DOCUMENTS

| | | | |
|---|---|---|---|
| 5,654,549 A * | 8/1997 | Landecker | G01C 11/02 348/208.99 |
| 2009/0251773 A1* | 10/2009 | Danziger | G02B 23/06 244/171.1 |
| 2013/0050488 A1* | 2/2013 | Brouard | H04N 23/11 348/E9.002 |

(Continued)

FOREIGN PATENT DOCUMENTS

JP  11-234547  8/1999

*Primary Examiner* — Angela Y Ortiz
*Assistant Examiner* — Aaron K McCullers
(74) *Attorney, Agent, or Firm* — Wenderoth, Lind & Ponack, L.L.P.

(57) ABSTRACT

An observation control device is applicable to a detector installed onboard a spacecraft for performing observation. The observation control device includes an orthogonal direction control unit configured to move an observation range in a direction orthogonal to a travel direction of the spacecraft, the observation range being a range observed by the detector, and a travel direction control unit configured to move the observation range in the travel direction of the spacecraft.

13 Claims, 16 Drawing Sheets

(56) References Cited

U.S. PATENT DOCUMENTS

| | | | | |
|---|---|---|---|---|
| 2015/0371431 A1* | 12/2015 | Korb | .......................... | G06T 7/75 |
| | | | | 382/113 |
| 2016/0073048 A1* | 3/2016 | Howe | .................. | H04N 9/8042 |
| | | | | 348/144 |
| 2017/0041548 A1* | 2/2017 | Robinson | ............. | H04N 23/687 |
| 2017/0270639 A1* | 9/2017 | Rousmaniere | ... | G01N 21/95684 |
| 2017/0294027 A1* | 10/2017 | Babenko | .................. | G06T 7/507 |
| 2019/0306407 A1* | 10/2019 | Ely | ........................ | H04N 23/54 |

\* cited by examiner

MOVEMENT

OBSERVATION CONTROL DEVICE AND SPACECRAFT, OBSERVATION CONTROL METHOD, AND OBSERVATION CONTROL PROGRAM

TECHNICAL FIELD

The present disclosure relates to an observation control device and spacecraft, an observation control method, and an observation control program.

BACKGROUND ART

Spacecraft such as artificial satellites are observing Earth with onboard sensors. In Earth observation, various methods are adopted, such as a method of scanning while the artificial satellite is being moved with the observation direction of the sensors fixed, and a method of scanning in a direction orthogonal to a travel direction (for example, see Japanese Unexamined Patent Application, Publication No. H11-234547).

CITATION LIST

Patent Literature

SUMMARY OF INVENTION

Technical Problem

Because Earth observation is performed for purposes such as observing the surface of the earth, in methods like the above, the observation in the travel direction depends on the satellite orbit (the velocity of the satellite). For example, for a satellite that completes one revolution around Earth in 90 minutes (the case of a low Earth orbit), the range observed in the travel direction is approximately 450 km/min. In other words, the range that can be observed per unit time is limited by the satellite orbit (the velocity of the satellite).

An object of the present disclosure, which has been devised in light of such circumstances, is to provide an observation control device and spacecraft, an observation control method, and an observation control program capable of performing observation over a wider range in a short amount of time.

Solution to Problem

A first aspect of the present disclosure is an observation control device applicable to a detecting means installed onboard a spacecraft for performing observation, comprising an orthogonal direction control unit that moves an observation range in a direction orthogonal to a travel direction of the spacecraft, the observation range being a range observed by the detecting means, and a travel direction control unit that moves the observation range in the travel direction of the spacecraft.

A second aspect of the present disclosure is an observation control method applicable to a detecting means installed onboard a spacecraft for performing observation, comprising moving an observation range in a direction orthogonal to a travel direction of the spacecraft, the observation range being a range observed by the detecting means, and moving the observation range in the travel direction of the spacecraft.

A third aspect of the present disclosure is an observation control program applicable to a detecting means installed onboard a spacecraft for performing observation, the observation control program causing a computer to execute a process comprising moving an observation range in a direction orthogonal to a travel direction of the spacecraft, the observation range being a range observed by the detecting means, and moving the observation range in the travel direction of the spacecraft.

Advantageous Effects of Invention

According to the present disclosure, an effect of being able to perform observation over a wider range in a short amount of time is exhibited.

DESCRIPTION OF EMBODIMENTS

First Embodiment

Hereinafter, a first embodiment of the observation control device and spacecraft, the observation control method, and the observation control program according to the present disclosure will be described with reference to the drawings. An observation control device 40 according to the present embodiment is applied to a spacecraft. In other words, the present embodiment is applicable to devices such as an artificial satellite for example, insofar as the device is a man-made object expected to be used in outer space (that is, a spacecraft). The present embodiment is described by taking the case where the observation control device 40 is installed onboard a spacecraft as an example, but the present embodiment may also be installed in a ground station and adapted to a spacecraft through the transmission and reception of signals or the like.

Figure 1:
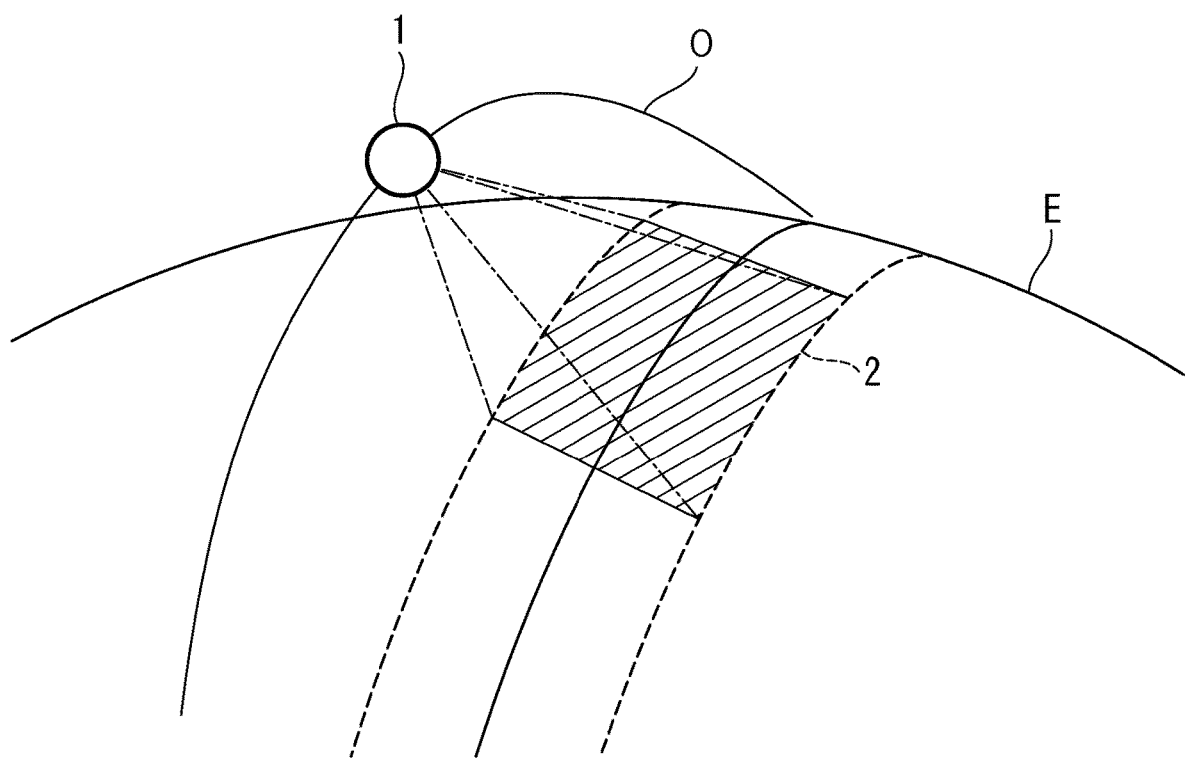
FIG. 1 is a diagram illustrating an example of observation in an artificial satellite according to a first embodiment of the present disclosure.

FIG. 1 is a diagram illustrating an example of a case of performing observation with an artificial satellite 1 equipped with the observation control device 40 according to the first embodiment of the present disclosure. In FIG. 1, the artificial satellite 1 circles Earth E in an orbit O. The orbit O is not limited to a low Earth orbit (LEO) or a medium Earth orbit (MEO) for example. The artificial satellite 1 carries out observation in the direction toward Earth (Earth direction) from the position where the artificial satellite 1 exists in outer space. The observation is performed by a detecting means described later. As illustrated in FIG. 1, the artificial satellite 1 is capable of observing a scanning range 2 having a width in the forward-and-backward direction in the direction of travel (orbital direction) of the artificial satellite 1 (hereinafter referred to as the "travel direction") and also in a direction orthogonal to the travel direction (hereinafter referred to as the "orthogonal direction"). Namely, in the scanning range 2, it is possible to move an observation range 3 in the travel direction (that is, the forward-and-backward direction) and also in the orthogonal direction (that is, the left-and-right direction). In other words, any region in the scanning range 2 can be observed.

Figure 2:
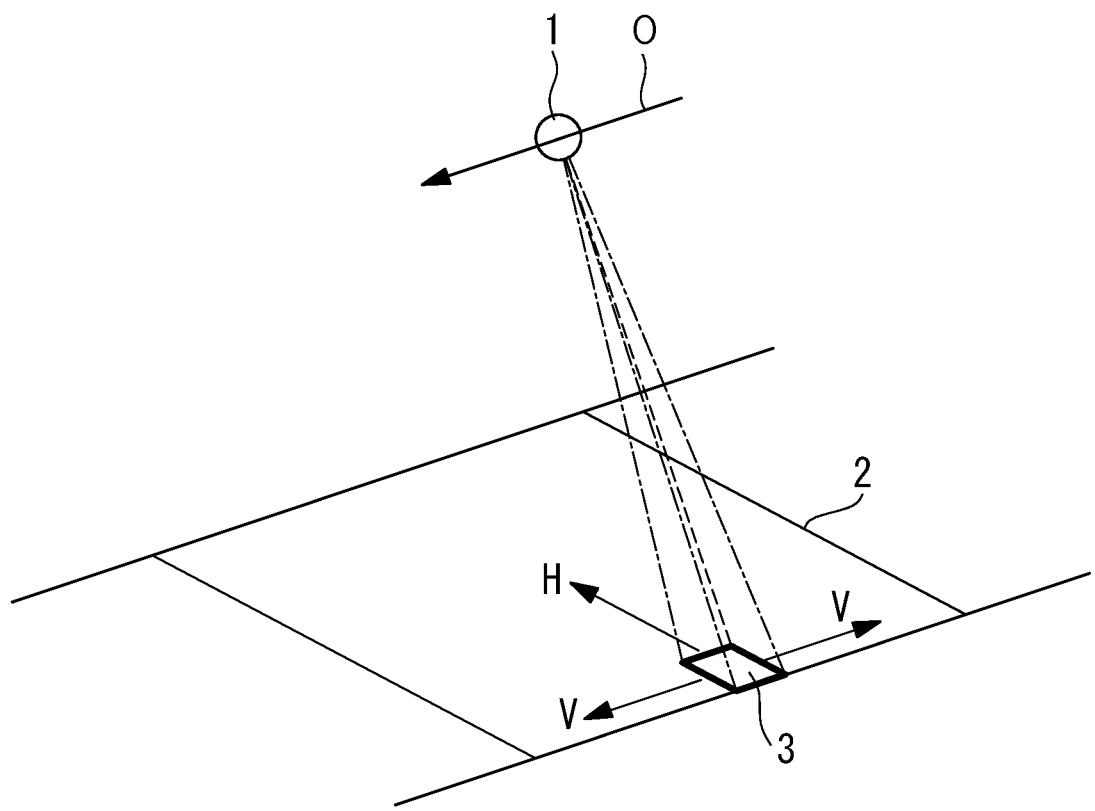
FIG. 2 is a diagram illustrating an example of observation control in the artificial satellite according to the first embodiment of the present disclosure.

The observation control device 40 controls the range of observation (observation direction control). Specifically, as illustrated in FIG. 2, within the scanning range 2, the observation control device 40 moves an observation target position (observation range) 3 in not only the orthogonal direction (H direction) but also in the travel direction (V direction) of the artificial satellite 1. The observation range 3 is the range that is observable at one time by a sensor system. In other words, because the observation range 3 is movable inside the scanning range 2, observation over a wide range is possible. As described later, the observation control device 40 is equipped with an onboard sensor system. The position where the sensor system is installed onboard the observation control device 40 is not limited.

Figure 3:
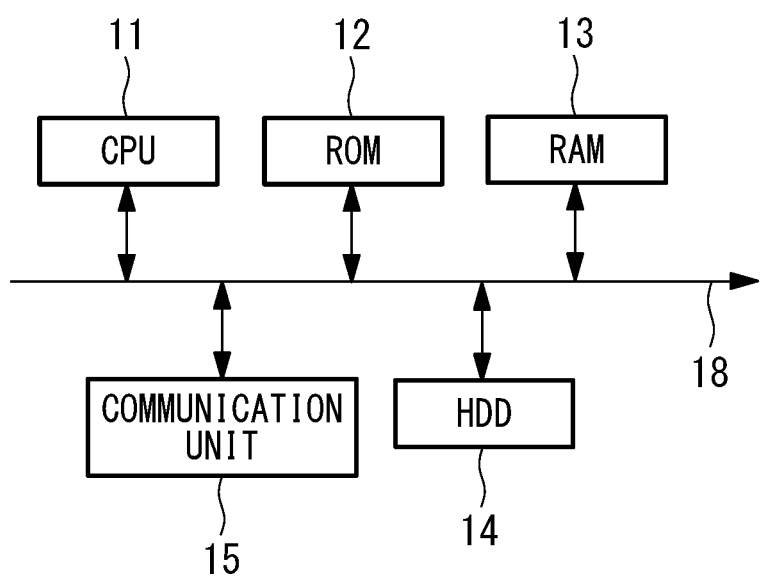
FIG. 3 is a diagram illustrating an example of a hardware configuration in an observation control device according to the first embodiment of the present disclosure.

FIG. 3 is a diagram illustrating an example of a hardware configuration of the observation control device 40 according to the present embodiment.

As illustrated in FIG. 3, the observation control device 40 is a computer system, and is provided with a central processing unit (CPU) 11, read-only memory (ROM) 12 for storing information such as programs to be executed by the CPU 11, random access memory (RAM) 13 that functions as a work area during the execution of each program, a hard disk drive (HDD) 14 that acts as a mass storage device, and a communication unit 15 for connecting to a network or the like. These components are connected to each other through a bus 18. It is also possible to use another storage volume such as a solid-state drive (SSD) as the mass storage device.

The observation control device 40 may also be provided with components such as an input unit including devices such as a keyboard and mouse, and a display unit including a device such as a liquid crystal display device that displays data.

The storage medium for storing information such as programs to be executed by the CPU 11 is not limited to the ROM 12. For example, another auxiliary storage device such as a magnetic disk, a magneto-optical disc, or semiconductor memory may also be used.

A series of processes for achieving the various functions described later is recorded in the hard disk drive 14 or the like in the form of a program, and by having the CPU 11 load the program into the RAM 13 or the like and execute information processing and computational processing, the various functions described later are achieved. The program may also be applied in a format such as by being preinstalled in the ROM 12 or another storage medium, being provided in a stored state in a computer readable storage medium, or by being delivered over a wired or wireless communication means. A computer readable storage medium refers to a medium such as a magnetic disk, a magneto-optical disc, CD-ROM, DVD-ROM, and semiconductor memory.

Figure 4:
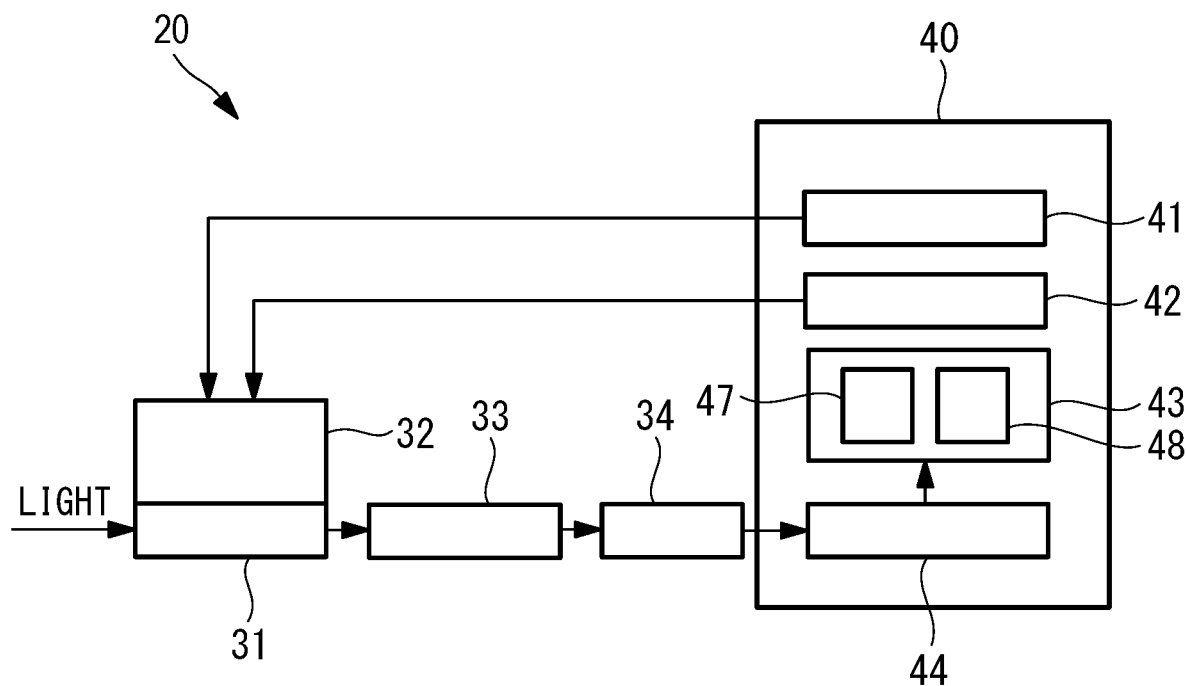
FIG. 4 is a function block diagram illustrating functions provided in a sensor system according to the first embodiment of the present disclosure.

FIG. 4 is a function block diagram illustrating functions provided in the sensor system (20 in FIG. 4). The sensor system is a unit that carries out observation with a detecting means, and the observation direction is controlled by the observation control device 40. The present embodiment describes a case where observation is carried out by detecting light (such as infrared rays) from the observation direction (from Earth). The light may be visible light or invisible light.

As illustrated in FIG. 4, the sensor system is provided with a mirror (reflecting means) 31, a gimbal 32, a lens 33, a detector (detecting means) 34, and the observation control device 40. FIG. 4 illustrates an example of a case where the sensor system is provided as a single system (sensor system 20), but the sensor system may also be treated as two systems (sensor system 20 and sensor system 30) or as plural systems (sensor system 20, sensor system 30, and at least one additional sensor system).

The mirror 31 is a reflecting means that guides light from the observation direction to the detector 34. In other words, the mirror 31 reflects incident light and relays the light in the detector 34 direction, such that the light from the observation range 3 is incident on the detector 34 via the mirror 31.

The gimbal 32 is a device that alters the angle of the mirror 31. In other words, the gimbal 32 changes the angle of the reflective surface of the mirror 31, and changes the arrival direction of the light guided to the detector 34. The gimbal 32 is capable of adjusting the angle about the two axes of the travel direction axis and the orthogonal direction axis of the artificial satellite 1, for example. In other words, by adjusting the angle of the reflective surface about the travel direction axis, the arrival direction of light in the orthogonal direction can be changed. By adjusting the angle of the reflective surface about the orthogonal direction axis, the arrival direction of light in the travel direction can be changed. The gimbal 32 may also be capable of adjusting the angle in a single axis direction.

FIG. 4 illustrates an example of a case in which a single mirror 31 is used, but it is also possible to provide a plurality of mirrors 31. For example, in the case of using two mirrors 31 to guide light to the detector, each mirror 31 is provided with the gimbal 32. In other words, the respective angles of a first reflective surface and a second reflective surface in the reflecting means are controlled so that light is guided to the detector 34.

The lens 33 condenses the light guided by the mirror 31 and guides to the detector 34. Through the lens 33, light is condensed onto a light-receiving part (light-receiving surface) of the detector 34.

The detector 34 detects light input through an optical system such as the mirror 31 and the lens 33. Although the present embodiment describes a case of treating infrared rays as the light, the light is not limited to infrared rays. The detector 34 is an IR sensor (IR camera), for example. For the IR camera, a device such as an MCT detector or a T2SL detector can be applied, and the type of camera is not limited.

In the detector 34, the light from the observation range 3 to be observed is guided to the light-receiving part through the optical system. The observation range 3 is the range that is detectable all at once in the detector 34 (sensor system), and is set on the basis of the instantaneous field of view, for example. For instance, in the case where the instantaneous field of view is α°, the range of α° is the observation range 3, and light from this range can be detected. In the light-receiving part, picture elements (pixels) are arrayed in a matrix of rows and columns. For example, the pixels are arranged in a matrix according to a preset resolution, such as several hundred pixels vertically by several hundred pixels horizontally. Additionally, when light is incident on the light-receiving part, an electric charge is produced in each pixel according to the intensity of the light (the intensity of the infrared rays, for example). Furthermore, by detecting the magnitude of the electric charge produced in each pixel as an electrical signal, the intensity of the light at the position corresponding to each pixel can be obtained, and the intensity of light can be quantified and handled as image data. For example, taking the intensity of infrared rays as an example, the positions of pixels where strong infrared rays are incident on the light-receiving part can be displayed as white, while the positions of pixels where weak infrared rays are incident on the light-receiving part can be displayed as black.

With this arrangement, in the detector 34, the intensity of the light from the observation range 3 can be detected at the position of each pixel. As described later, the detection by the detector 34 is performed every time the observation range 3 is moved, and a wide range like the scanning range 2 in FIG. 1 is observed.

In the case where the detector 34 has a suitable operating temperature or the like, a device such as a cooler may also be provided for temperature control.

Figure 5:
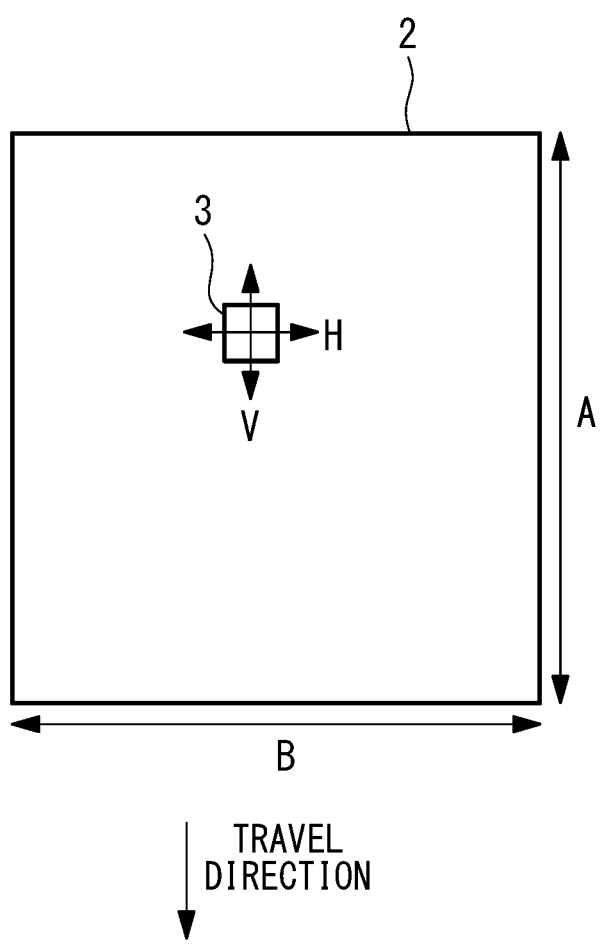
FIG. 5 is a diagram illustrating an example of a scanning range according to the first embodiment of the present disclosure.

The observation control device 40 controls the movement of the observation range 3. The observation range 3 is the range that can be detected all at once in the sensor system, and by changing the position of the observation range 3 (that is, by moving the observation range 3), the observation control device 40 is capable of observing any position. As illustrated in FIG. 5, the observation range 3 is movable inside the scanning range 2. In other words, the scanning range 2 represents a wider range than the observation range 3. The scanning range 2 is rectangular, with one edge (A in FIG. 5) being defined by the distance the observation range 3 can be moved in the travel direction and another edge (B in FIG. 5) being defined by the distance the observation range 3 can be moved in the direction orthogonal to the travel direction. The scanning range 2 is not limited to a rectangular shape like in FIG. 5, insofar as the scanning range 2 is set as a region in which the observation range 3 is movable.

For this reason, the observation control device 40 is provided with an orthogonal direction control unit 42, a travel direction control unit 41, a detector driving unit 44, and a processing unit 43.

The orthogonal direction control unit 42 moves the range to be observed by the detecting means, namely the observation range 3, in the orthogonal direction of the artificial satellite 1. Specifically, the orthogonal direction control unit 42 controls the gimbal 32 to control the reflective surface of the mirror 31 and move the position of the observation range 3 in the orthogonal direction (the H direction in FIG. 5).

As a result of the observation range 3 being moved in the orthogonal direction, observation is possible in the direction (left-and-right direction) orthogonal to the travel direction of the artificial satellite 1.

The travel direction control unit 41 moves the range to be observed by the detecting means, namely the observation range 3, in the travel direction of the artificial satellite 1. Specifically, the travel direction control unit 41 controls the gimbal 32 to control the reflective surface of the mirror 31 and move the position of the observation range 3 in the travel direction (the V direction in FIG. 5).

As a result of the observation range 3 being moved in the travel direction, observation is possible in the travel direction (forward-and-backward direction) of the artificial satellite 1.

Because the observation range 3 can be moved by the orthogonal direction control unit 42 and the travel direction control unit 41 in the orthogonal direction (H direction in FIG. 5) and the travel direction (V direction in FIG. 5) inside the scanning range 2 as illustrated in FIG. 5, wide-range observation can be performed. Observation is achieved by having the sensor system observe (acquire image data of) the observation range 3, and then having the sensor system observe (acquire image data of) the moved observation range 3.

The orthogonal direction control unit 42 and the travel direction control unit 41 move the observation range 3 in accordance with the purpose of observation. Specifically, in the case of conducting a search, the orthogonal direction control unit 42 and the travel direction control unit 41 move the observation range 3 in the orthogonal direction and the travel direction according to a preset scanning pattern, as described later. In the case of tracking, the orthogonal direction control unit 42 and the travel direction control unit 41 move the observation range 3 in the orthogonal direction and the travel direction such that the detected position of a target is positioned in the center of the observation range 3, as described later.

The detector driving unit 44 detects the magnitude of the electric charge produced in each pixel in the detector 34. For example, the detector driving unit 44 acquires and digitizes (quantifies) the magnitude of the electric charge produced in each pixel in correspondence with a row number and a column number. Additionally, the numerical data is expressed as a shade (for example, black and white) in correspondence with the row number and the column number, and image data is generated. In other words, in the case where intense light is incident on the pixel in the 3rd row and 10th column in the light-receiving part of the detector 34, the position corresponding to the 3rd row and the 10th column is displayed as white in the image data. This arrangement makes it possible to distinguish which positions of the light-receiving part have received intense light.

The image data generated by the detector driving unit 44 is output to the processing unit 43 described later.

The processing unit 43 performs a search process and a tracking process. Consequently, the processing unit 43 includes a search unit 47 and a tracking unit 48. In the case of performing one of either searching or tracking, it is also possible to provide one of either the search unit 47 or the tracking unit 48.

The search unit 47 conducts a target search on the basis of information obtained by moving the observation range 3 to scan inside the scanning range 2. A search refers to searching the scanning range 2 for a target. In the case of conducting a search, the observation range 3 is moved to scan inside the scanning range 2. In other words, in a search, the observation range 3 is moved inside the scanning range 2 to scan and observe the entire scanning range 2.

Figure 6:
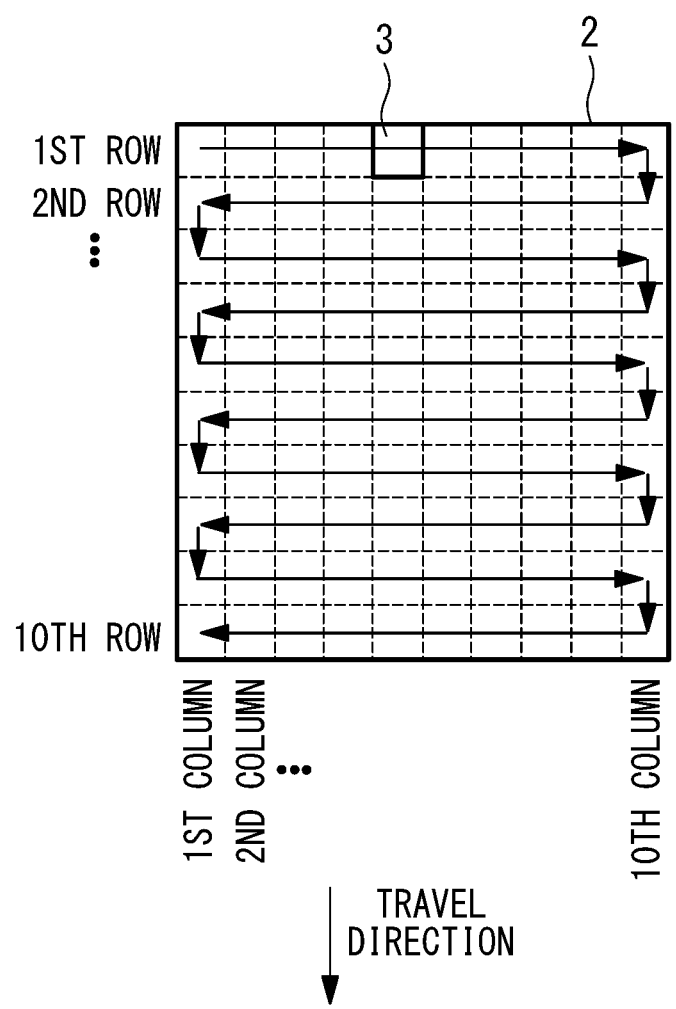
FIG. 6 is a diagram illustrating an example of a search in the observation control device according to the first embodiment of the present disclosure.

FIG. 6 is a diagram illustrating an example of a scanning pattern in the case of conducting a search. In FIG. 6, the scanning range 2 is illustrated as a matrix having 1st to 10th rows and 1st to 10th columns as an example, but the numbers of rows and columns are set appropriately according to the specifications of the sensor system to use. In other words, the scanning range 2 is generalized and expressed as a matrix of m rows and n columns (where m and n are appropriately settable). The matrices illustrated in FIGS. 7 and 9 described later are also examples, and like FIG. 6, the matrix of the scanning range 2 is set appropriately according to the specifications of the sensor system.

To observe the entire scanning range 2, the observation range 3 is set to observe a start point of the scanning range 2 (1st row, 1st column in FIG. 6), and after observation, the observation range 3 is moved in the orthogonal direction and observation is performed again (1st row, 2nd column in FIG. 6). In the detector 34, because light from the observation range 3 is detected by the pixels arranged in a matrix, even smaller positions (individual pixel positions) in the observation range 3 (1st row, 2nd column for example) can be observed. In this way, the observation range 3 is moved in the orthogonal direction to observe a position corresponding to each column in a specific row, and when the observation of the row is finished (1st row, 10th column in FIG. 6), the observation range 3 is moved in the travel direction to observe the next row (from the 2nd row, 10th column to the 2nd row, 1st column in FIG. 6). By moving the observation range 3 in the orthogonal direction and the travel direction to perform observation in this way, the entire scanning range 2 can be scanned. By scanning the entire scanning range 2, image data of the entire scanning range 2 can be obtained from the image data of each observation range 3.

The matrix range (for example, the range corresponding to the 1st row, 2nd column) like in FIG. 6 corresponds to the observation range 3. Consequently, by moving the observation range 3 in accordance with the matrix, the entire scanning range 2 can be scanned. The matrix range may also be set to a range smaller than the observation range 3. In this case, the observation range 3 before being moved and the observation range 3 after being moved can be made to overlap partially, and areas of missed observation can be reduced.

In the search unit 47, a target search is conducted on the basis of information obtained by moving the observation range 3 to scan inside the scanning range 2 as in FIG. 6, or in other words, image data of the entire scanning range 2 (entire image data). Specifically, positions where intense light is detected are specified according to the numerical data (shade data) of each position in the entire image data. For example, a search may be conducted by a comparison between the numerical data and a threshold value, or on the basis of the S/N ratio. Taking infrared rays as an example, the positions where intense infrared rays are detected in the scanning range 2 are specified. For example, if intense infrared rays are detected at a certain pixel position inside the range corresponding to the 1st row and 2nd column in the entire image data, it can be inferred that an object emitting intense infrared rays exists at the position corresponding to that pixel position of the scanning range 2. With this arrangement, a target search can be conducted inside the scanning range 2.

Because wide-range observation can be performed in a short amount of time in the observation control device 40, when the scanning of the observation range 3 from the start point to the end point in the scanning range 2 is completed, the search unit 47 may conduct a target search by rescanning from a start point set inside the scanning range 2. In other words, (all or part of) the scanning range 2 can be observed multiple times to improve the observation accuracy.

Specifically, in the case where a scan from the start point (1st row, 1st column) to the end point (10th row, 1st column) is completed like in FIG. 6, a rescan is performed from the start point set inside the scanning range 2. If scanning is possible from the start point (1st row, 1st column) of the previous scan, the same start point may be used as the start point set inside the scanning range 2. In this case, a scan from the start point (1st row, 1st column) to the end point (10th row, 1st column) is performed again, and the entire range is completely re-observed. It is also possible to rescan the scanning range 2 by setting a new start point different from the start point (1st row, 1st column) of the previous scan.

In the case of performing a rescan, the entire scanning range 2 may be rescanned or a portion of the scanning range 2 may be rescanned. In the case of rescanning a portion of the scanning range 2, a partial range inside the scanning range 2 that contains a position where a target has been detected (target detection position) may be rescanned.

In the present embodiment, because the observation range 3 can also be moved in the travel direction, rescanning is possible. Rescanning makes it possible to improve the observation accuracy.

The tracking unit 48 performs target tracking on the basis of information obtained by moving the observation range 3 inside the scanning range 2. Tracking refers to following a target detected in the scanning range 2. In the case of tracking, the observation range 3 is moved to track a target. When tracking, the entire scanning range 2 may be observed, or a partial range of the scanning range 2 that contains a position where the target has been detected may be observed. The present embodiment describes a case of tracking by observing a portion of the scanning range 2.

Figure 7:
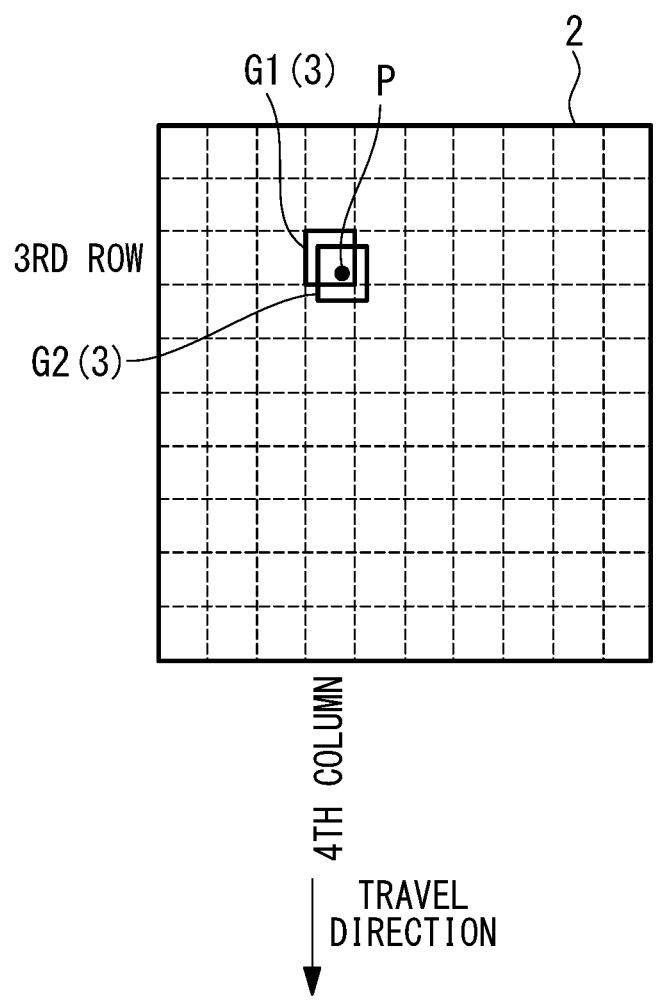
FIG. 7 is a diagram illustrating an example of tracking in the observation control device according to the first embodiment of the present disclosure.

FIG. 7 is a diagram illustrating an example of the movement of the observation range 3 in the case of tracking. In FIG. 7, assume that a target has been detected in a specific range (a point P in the 3rd row and 4th column) of the scanning range 2 from a search. In such a case, the observation range 3 is moved such that the detected position of the target (the point P) is positioned in the center of the observation range 3. Thereafter, re-observation (target detection) is performed. In FIG. 7, the observation position before movement is labeled G1(3), while the observation position after movement for tracking is labeled G2(3). In this way, by moving the observation range 3 such that the detection position of the target (the point P) is position in the center of the observation range 3, the observation range 3 can be moved in association with the movement of the target, making it possible to track the target. The tracking method is not limited to the above example and can be adapted. With this arrangement, image data of the observation range 3 containing the target can be obtained.

In the tracking unit 48, target tracking is performed on the basis of information obtained by moving the observation range 3 inside the scanning range 2 as in FIG. 7, or in other words, image data of the observation range 3 containing the target.

Figure 8:
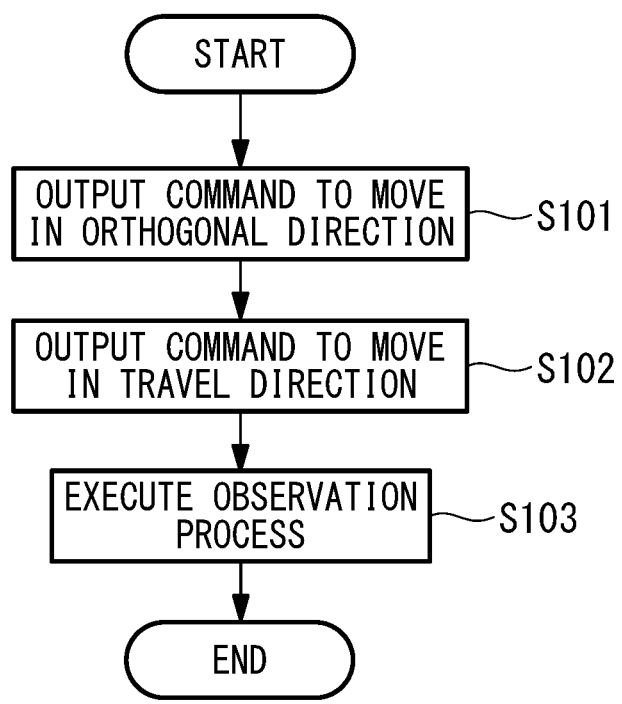
FIG. 8 is a diagram illustrating a flowchart of observation control according to the first embodiment of the present disclosure.

Next, an example of observation control by the observation control device 40 described above will be described with reference to FIG. 8. FIG. 8 is a flowchart illustrating an example of an observation control procedure according to the present embodiment. The flow illustrated in FIG. 8 is executed repeatedly on a predetermined control cycle, for example.

First, a command to move the observation range 3 in the orthogonal direction is output (S101). Specifically, the orthogonal direction movement command is output to the gimbal 32.

Additionally, a command to move the observation range 3 in the travel direction is output (S102). Specifically, the travel direction movement command is output to the gimbal 32.

The processes in S101 and S102 may also be executed in reverse order or in parallel.

Thereafter, a process of observing the moved observation range 3 is performed (S103). In the observation process, the detector 34 acquires data from input light.

For a search, movement commands are output according to the scanning pattern, and the movement and observation of the observation range 3 are executed repeatedly. For tracking, movement commands are output such that the detected position of the target is positioned in the center of the observation range 3, and the movement and observation of the observation range 3 are executed repeatedly.

Next, effects obtained by the observation control described above will be described with reference to FIG. 1. In the case of performing observation in the travel direction in association with the movement of the artificial satellite 1, observation in the travel direction is limited by the movement of the artificial satellite 1, and therefore observation in the travel direction may be time-consuming in some cases. For example, for a satellite that completes one revolution around Earth in 90 minutes (the case of a low Earth orbit), the range observed in the travel direction is approximately 450 km per minute.

However, as illustrated in FIG. 1, in the observation control device 40 according to the present embodiment, the observation direction can be controlled not only in the orthogonal direction of the artificial satellite 1 but also in the travel direction. In other words, it is possible to perform observation in the travel direction without being limited by the movement in the travel direction of the artificial satellite 1. For example, even with a satellite that completes one revolution around Earth in 90 minutes (the case of a low Earth orbit), the observable range in the travel direction can be set to 450 km or more (for example, 1000 km) per minute. Consequently, in the observation control device 40 according to the present embodiment, it is possible to observe a wider range in a short amount of time.

Figure 9:
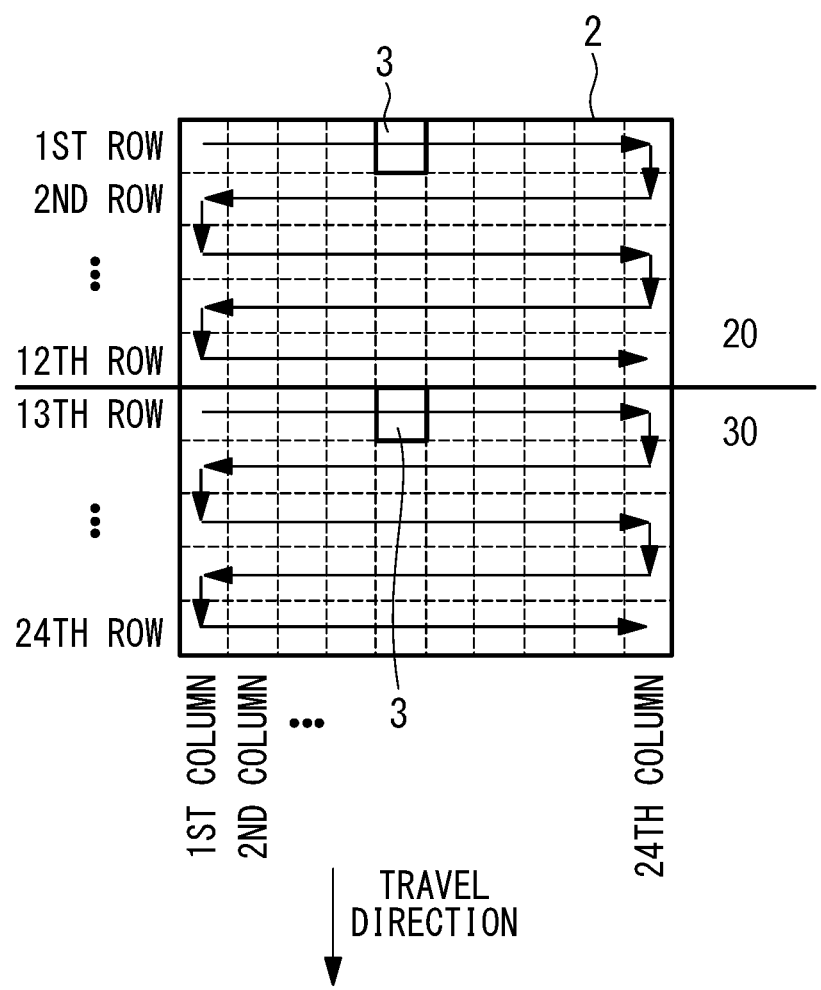
FIG. 9 is a diagram illustrating an example of a search in the observation control device according to the first embodiment of the present disclosure.

The above example describes the case of performing searching and tracking using a single sensor system, but it is also possible to use a plurality of sensor systems. For instance, an example of a search in the case of using two sensor systems is illustrated in FIG. 9. In other words, it is also possible to conduct a search by dividing the scanning range 2 into a range for each sensor system. FIG. 9 illustrates the case of dividing the scanning range 2 into a range for each sensor system to the travel direction, but the configuration is not limited to FIG. 9. In the example of FIG. 9, the sensor system 20 scans from a start point (1st row, 1st column) to an end point (12th row, 24th column), and the sensor system 30 scans from a start point (13th row, 1st column) to an end point (24th row, 24th column). By scanning the entire scanning range 2 with two sensor systems in this way, image data of the entire scanning range 2 can be obtained from the image data of each observation range 3. In the case of using a plurality of sensor systems, it is possible to observe a wide range in a shorter amount of time. Wide-range measurement is also possible even in the case where the observation range 3 is reduced due to the specifications of the sensor system.

As described above, according to the observation control device and spacecraft, observation control method, and observation control program according to the present embodiment, in observation by a spacecraft, the observation range 3 can be moved not only in the direction orthogonal to the travel direction of the spacecraft but also in the travel direction, thereby making wide-range observation possible. Because the observation in the travel direction can be performed irrespectively of the orbit (velocity) of the spacecraft, observation in the travel direction can be performed in a shorter amount of time.

Because the observation range 3 is moved to scan inside the scanning range 2, the scanning range 2 can be observed and a target search can be conducted. Because the observation range 3 can be moved inside the scanning range 2, it is possible to track a target on the basis of information obtained by observation.

In other words, it is possible to observe a wider range in a short amount of time.

Second Embodiment

Next, an observation control device and spacecraft, an observation control method, and an observation control program according to a second embodiment of the present disclosure will be described.

The present embodiment describes a case of correcting an image of light guided to the detector 34. Hereinafter, the points that differ from the first embodiment with regard to the observation control device and spacecraft, the observation control method, and the observation control program according to the present embodiment will be described mainly.

Figure 10:
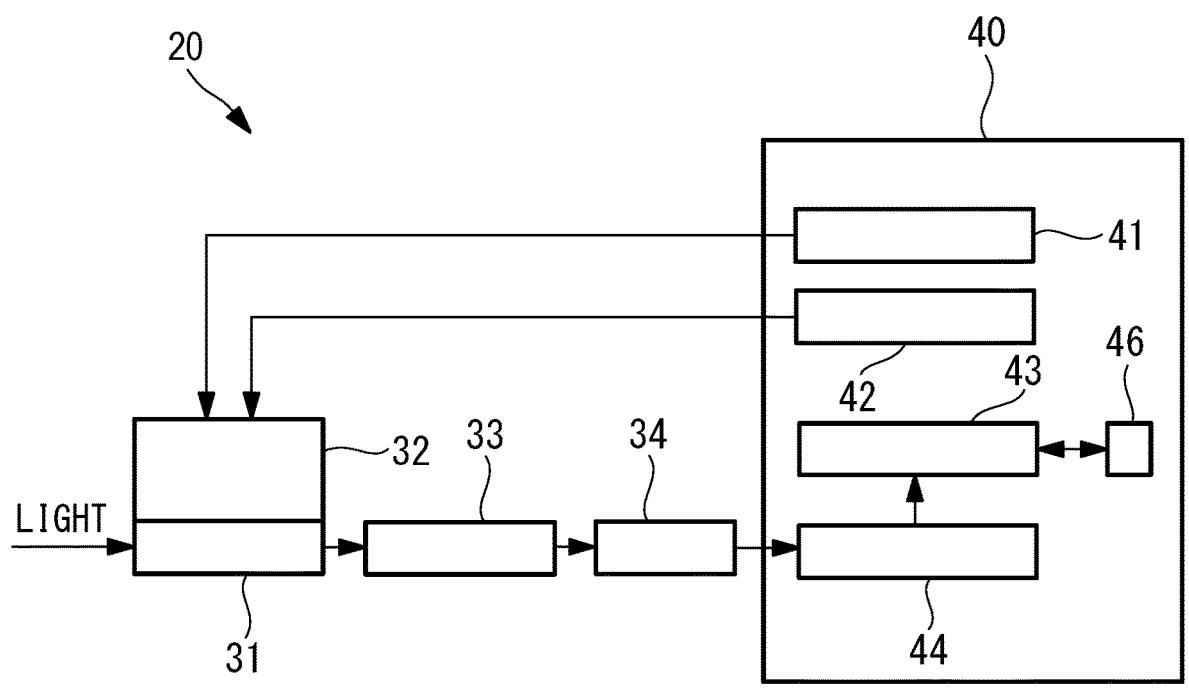
FIG. 10 is a function block diagram illustrating functions provided in a sensor system according to a second embodiment of the present disclosure.

As illustrated in FIG. 10, the observation control device 40 according to the present embodiment is provided with a correction unit 46.

The correction unit 46 corrects distortions in the image occurring due to the relaying of light by the reflecting means. When light is guided to the detector 34 by being reflected by the mirror 31, the detected image data may not be image data as viewed from directly above the observation range 3 (for example, rectangular data) in some cases due to the depth of the observation range 3 with respect to the artificial satellite 1 and the angle of the reflective surface. In other words, distortion may occur in the images joined in the light-receiving part of the detector 34 in some cases. The correction unit 46 corrects such distortions with image processing.

The present embodiment illustrates an example of a configuration in which the correction unit 46 is provided with respect to the processing unit 43 and the image data acquired from the detector 34 is corrected by software with image processing, but the correction method may also be configured such that the correction unit 46 is provided in another position and the image data is corrected by software, or the image data may be corrected by hardware in the optical system such as the mirror 31 and the lens 33.

As described above, according to the observation control device and spacecraft, observation control method, and observation control program according to the present embodiment, in the case of guiding light by reflecting the light off a reflective surface in a reflecting means, distortions such as a tilting of the image may occur in the guided light in some cases, but by correcting such distortions, the distortions can be reduced. The correction may be achieved mechanically in the reflecting means or by subjecting the detected signal to processing (for example, image processing) or the like.

Third Embodiment

Next, an observation control device and spacecraft, an observation control method, and an observation control program according to a third embodiment of the present disclosure will be described.

In the present embodiment, the control of the observation range 3 will be described. Hereinafter, the points that differ from the first and second embodiments with regard to the observation control device and spacecraft, the observation control method, and the observation control program according to the present disclosure will be described mainly.

In the present embodiment, after observation is performed in the observation range 3, at least one of the orthogonal direction control unit 42 and the travel direction control unit 41 moves the observation range 3 so as to be partially superimposed onto the observation range 3 where the observation has been performed. In the present embodiment, when moving the observation range 3, the orthogonal direction control unit 42 and the travel direction control unit 41 cause the observation range 3 to overlap with another observation range 3. In other words, when observation is completed for a certain observation range 3 and the observation range 3 is moved to observe the next observation range 3, the observation range 3 is moved such that the next observation range 3 is partially superimposed onto the previous observation range 3. In this way, the observation range 3 from before the movement is partially superimposed onto the observation range 3 after the movement. In the present embodiment, it is assumed that after observing the Nth observation range 3, the observation range 3 is moved to observe the (N+1)th observation range 3. Also, a moving target is designated P1.

Figure 11:
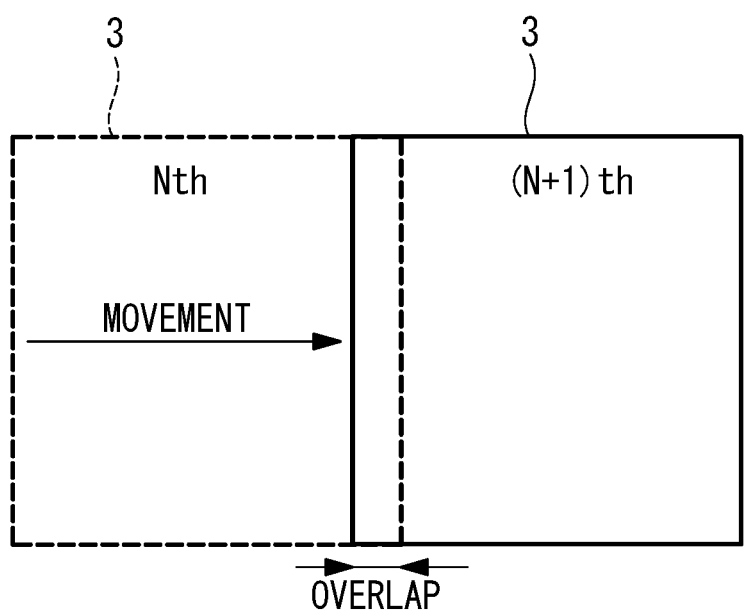
FIG. 11 is a diagram illustrating an overlap between observation ranges according to a third embodiment of the present disclosure.

FIG. 11 is a diagram illustrating the overlap of the observation ranges 3. As illustrated in FIG. 11, the observation range 3 is moved such that the Nth observation range 3 and the (N+1)th observation range 3 to be observed next are partially superimposed onto each other. The range where the observation ranges are duplicated is called the overlap range. The overlap range is set to one or more pixel columns. Consequently, the overlap range is observed both in the Nth observation range 3 and in the (N+1)th observation range 3.

Figure 12:
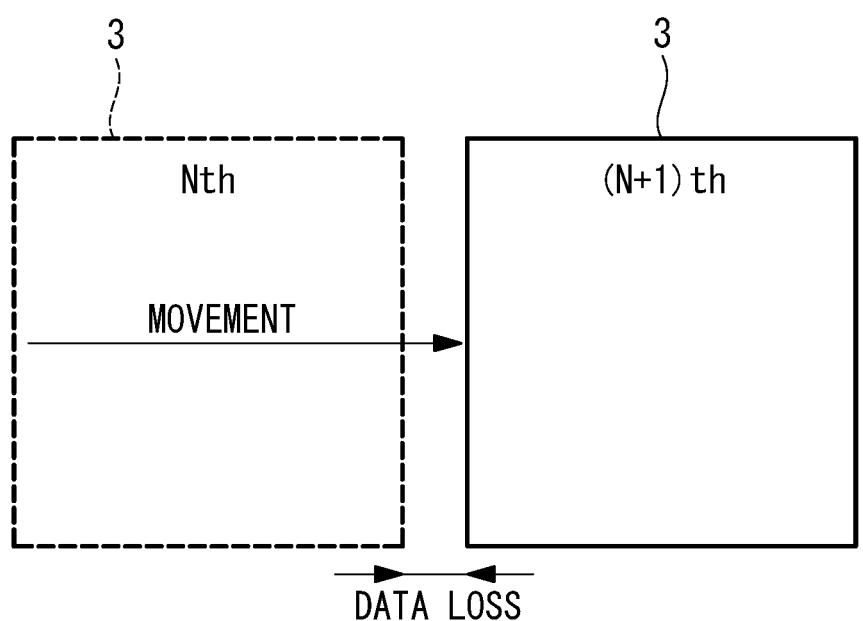
FIG. 12 is a diagram illustrating an example in which a gap exists between the observation ranges.

By causing the observation ranges 3 to overlap, it is possible to reduce the occurrence of data loss due to gaps between the observation ranges 3 as illustrated in FIG. 12, for example.

Figure 13:
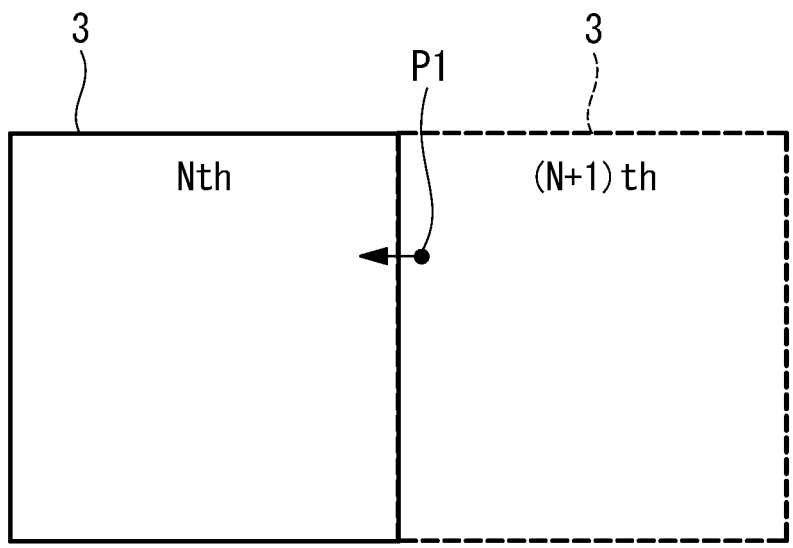
FIG. 13 is a diagram illustrating an example of the movement of an observation range in the case of not causing the observation ranges to overlap.
Figure 13:
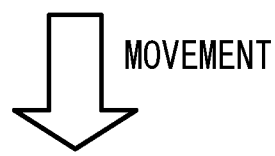
Figure 13:
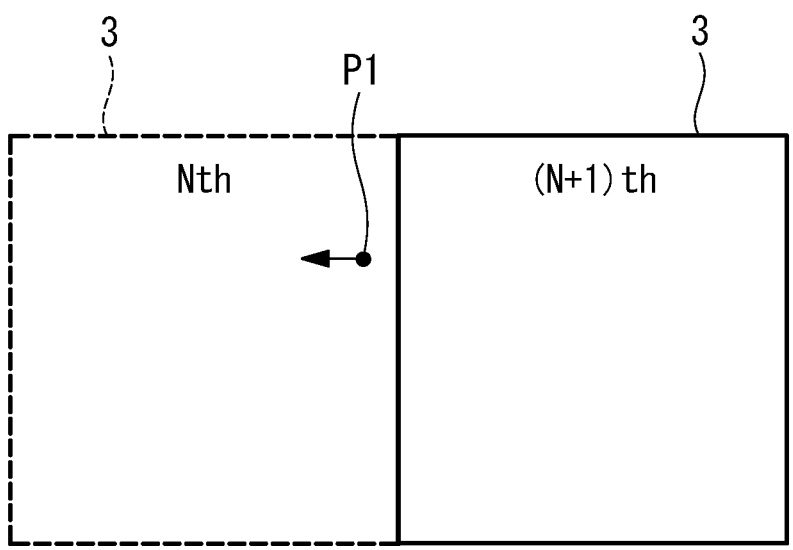

FIG. 13 is a diagram illustrating an example of the movement of the observation range 3 in the case of not causing the observation ranges to overlap. FIG. 13 illustrates the case where the Nth observation range 3 is being observed, in which P1 is positioned near the edge of the (N+1)th observation range 3, and P1 is moving in the opposite direction of the movement direction of the observation range 3. In such a case, if the observation range 3 is moved to the (N+1)th observation range 3, depending on the velocity of P1 and the movement timing of the observation range 3, there is a possibility that P1 will move into the Nth observation range 3 and be unobservable in the (N+1)th observation range 3.

Figure 14:
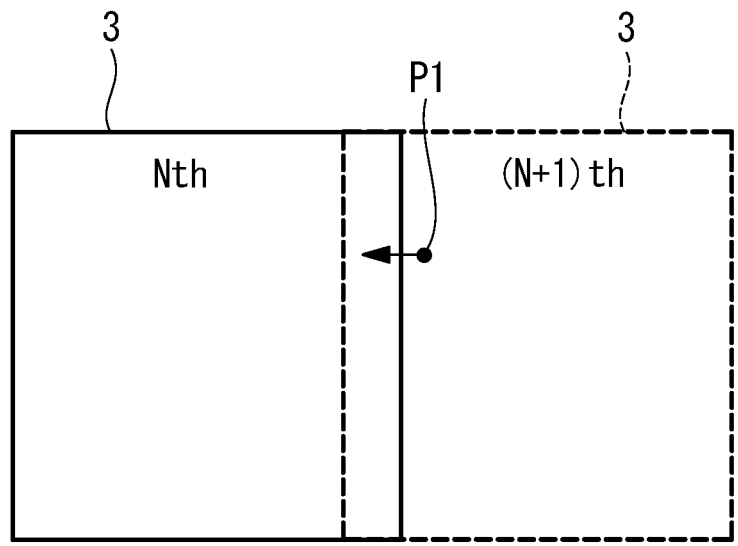
FIG. 14 is a diagram illustrating an example of the movement of an observation range in the case of causing the observation ranges to overlap.
Figure 14:
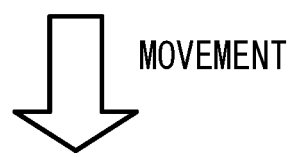
Figure 14:
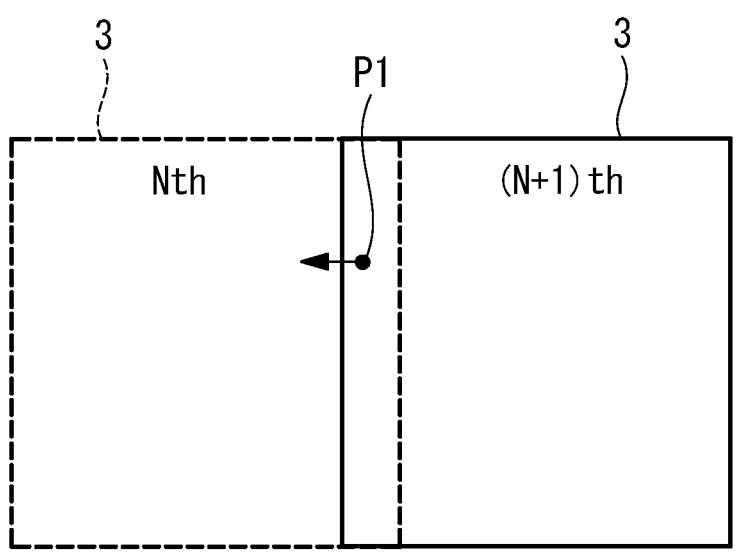

FIG. 14 is a diagram illustrating an example of the movement of the observation range 3 in the case of causing the observation ranges to overlap. FIG. 14 illustrates the case where the Nth observation range 3 is being observed, in which P1 is positioned near the edge of the (N+1)th observation range 3, and P1 is moving in the opposite direction of the movement direction of the observation range 3. In such a case, the observation range 3 is moved to the (N+1)th observation range 3. However, in FIG. 14, the observation range 3 is moved such that the (N+1)th observation range 3 is partially superimposed over (overlaps with) the Nth observation range 3. Consequently, even if P1 moves into the Nth observation range 3, P1 can be observed in the (N+1)th observation range 3. Causing the observation ranges to overlap makes it possible to improve the certainty of target detection near the boundaries of the observation range 3.

The partially superimposed range (overlap range) before and after the movement of the observation range 3 is set on the basis of the velocity of the observation target. In other words, the overlap range in which the Nth observation range 3 and the (N+1)th observation range 3 are superimposed is set on the basis of the speed of a moving target. Specifically, the overlap range is set equal to or greater than the distance that the target moves during an unobserved time between the observation timing of the Nth observation range 3 and the observation timing of the (N+1)th observation range 3. The overlap range may be set as a preset value or set as needed during observation.

The movement of the observation range 3 is not limited to the direction illustrated in FIGS. 13 and 14. For example, it is also possible to create an overlap with respect to the movement of the observation range 3 as illustrated in FIGS. 15 and 16.

Figure 15:
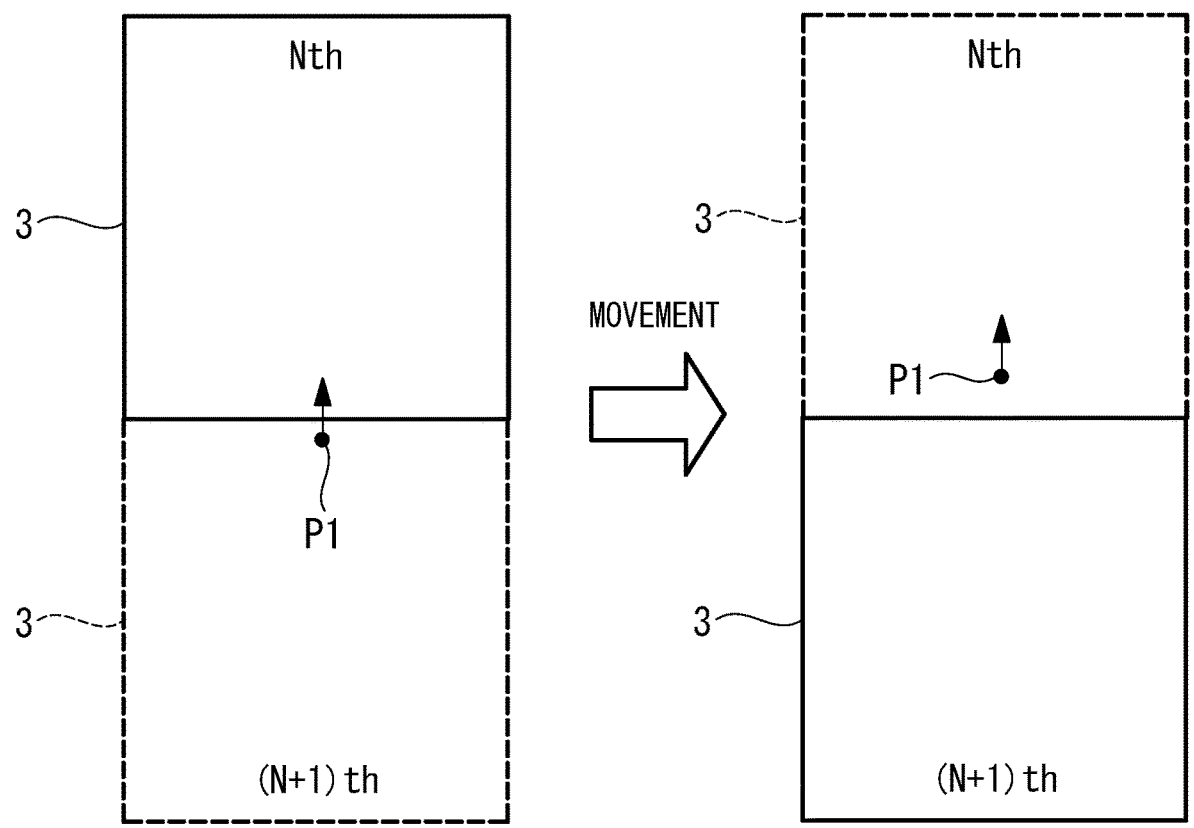
FIG. 15 is a diagram illustrating an example of the movement of an observation range in the case of not causing the observation ranges to overlap.

FIG. 15 is a diagram illustrating an example of the movement of the observation range 3 in the case of not causing the observation ranges to overlap. FIG. 15 illustrates the case where the Nth observation range 3 is being observed, in which P1 is positioned near the edge of the (N+1)th observation range 3, and P1 is moving in the opposite direction of the movement direction of the observation range 3. In such a case, if the observation range 3 is moved to the (N+1)th observation range 3, depending on the velocity of P1 and the movement timing of the observation range 3, there is a possibility that P1 will move into the Nth observation range 3 and be unobservable in the (N+1)th observation range 3.

Figure 16:
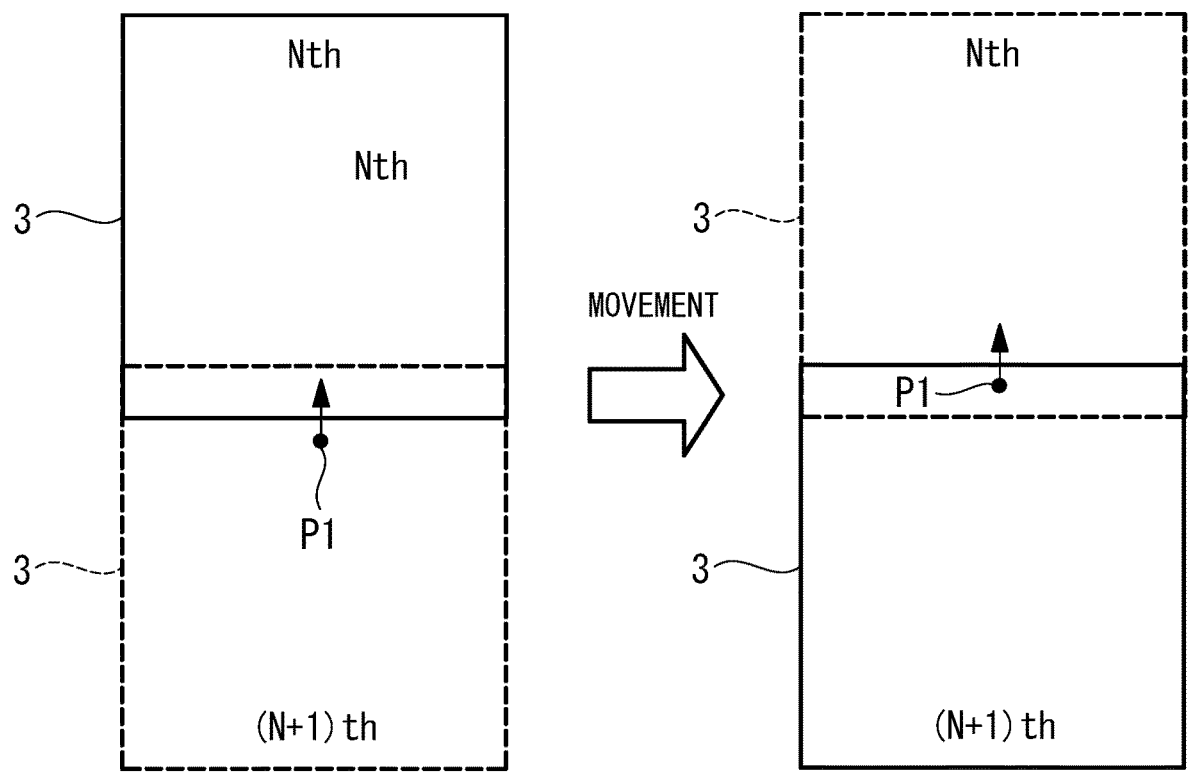
FIG. 16 is a diagram illustrating an example of the movement of an observation range in the case of causing the observation ranges to overlap.

FIG. 16 is a diagram illustrating an example of the movement of the observation range 3 in the case of causing the observation ranges to overlap. FIG. 16 illustrates the case where the Nth observation range 3 is being observed, in which P1 is positioned near the edge of the (N+1)th observation range 3, and P1 is moving in the opposite direction of the movement direction of the observation range 3. In such a case, the observation range 3 is moved to the (N+1)th observation range 3. However, in FIG. 16, the observation range 3 is moved such that the (N+1)th observation range 3 is partially superimposed over (overlaps with) the Nth observation range 3. Consequently, even if P1 moves into the Nth observation range 3, P1 can be observed in the (N+1)th observation range 3. Causing the observation ranges to overlap makes it possible to improve the certainty of target detection near the boundaries of the observation range 3.

The movement direction of the observation range 3 is not limited to the directions illustrated in FIGS. 13 to 16, and can be controlled in various directions such as up, down, left, right, and diagonally.

As described above, according to the observation control device and spacecraft, observation control method, and observation control program according to the present embodiment, after observation is performed in the observation range 3, the observation range 3 is moved so as to be partially superimposed onto the observation range 3 where the observation has been performed, thereby creating an overlap range between the observation ranges 3 before and after the movement. For this reason, the occurrence of an unobserved range can be suppressed. Furthermore, missed observation of a target near the boundaries of the observation range 3 can be suppressed. In other words, it is possible to improve the observation certainty.

The present disclosure is not limited only to the foregoing embodiments, and various modifications are possible without departing from the scope of the invention. It is also possible to combine the embodiments.

For example, each of the embodiments describes a case of moving the observation range 3 by controlling the reflective surface of the mirror 31, but the configuration is not limited to the above insofar as the observation range 3 can be moved. For example, the direction of the detector 34 itself may be adjusted to move the observation range 3 without adjusting the mirror 31. Adjustment of the mirror 31 and adjustment of the direction of the detector 34 itself may also be combined. In this way, the method of moving the observation range 3 is not limited insofar as the observation range 3 can be moved in the travel direction.

The observation control device and spacecraft, the observation control method, and the observation control program according to the embodiments described above may be understood as follows, for example.

An observation control device (40) according to the present disclosure is an observation control device (40) applicable to a detecting means (34) installed onboard a spacecraft (1) for performing observation, comprising: an orthogonal direction control unit (42) that moves an observation range (3) in a direction orthogonal to a travel direction of the spacecraft (1), the observation range (3) being a range observed by the detecting means (34); and a travel direction control unit (41) that moves the observation range (3) in the travel direction of the spacecraft (1).

According to the observation control device (40) according to the present disclosure, in observation by the spacecraft (1), the observation range (3) can be moved not only in the direction orthogonal to the travel direction of the spacecraft (1) but also in the travel direction, thereby making wide-range observation possible. Because the observation in the travel direction can be performed irrespectively of the orbit (velocity) of the spacecraft (1), observation in the travel direction can be performed in a shorter amount of time. In other words, it is possible to observe a wider range in a short amount of time.

The observation control device (40) according to the present disclosure may also be configured such that the travel direction control unit (41) moves the observation range (3) in the travel direction by controlling an angle of a reflective surface of a reflecting means that guides light from the observation range (3) to the detecting means (34).

According to the observation control device (40) according to the present disclosure, observation in the travel direction is possible by controlling the angle of the reflective surface of the reflecting means that guides light from the observation range (3) to the detecting means (34). Consequently, because the direction of the detecting means (34) itself can be fixed in place, increased complexity of the configuration can be reduced. Reductions in cost and weight may also be attained.

The observation control device (40) according to the present disclosure may also be configured such that the travel direction control unit (41) moves the observation range (3) in the travel direction by controlling an angle of each of a first reflective surface and a second reflective surface of the reflecting means that guides light from the observation range (3) to the detecting means (34).

According to the observation control device (40) according to the present disclosure, observation in the travel direction is possible by controlling the angle of each of the first reflective surface and the second reflective surface of the reflecting means that guides light from the observation range (3) to the detecting means (34). Consequently, because the direction of the detecting means (34) itself can be fixed in place, increased complexity of the configuration can be reduced. Because light is guided by the first reflective surface and the second reflective surface, the movement of the observation range (3) can be controlled precisely by controlling the respective angles of the reflective surfaces.

The observation control device (40) according to the present disclosure may also be configured such that the orthogonal direction control unit (42) controls the angle to move the observation range (3) in the direction orthogonal to the travel direction.

According to the observation control device (40) according to the present disclosure, by controlling the angle of each reflective surface in not only the travel direction but also the orthogonal direction, the direction of the detecting means (34) itself can be fixed in place, and therefore a minimal configuration of the system can be attained.

The observation control device (40) according to the present disclosure may also be configured such that the observation range (3) is movable inside a scanning range (2) having one edge defined by a distance the observation range (3) is movable in the travel direction and another edge defined by a distance the observation range (3) is movable in the direction orthogonal to the travel direction.

According to the observation control device (40) according to the present disclosure, a range having one edge defined by a distance the observation range (3) is movable in the travel direction and another edge defined by a distance the observation range (3) is movable in the direction orthogonal to the travel direction is treated as the scanning range (2), and the observation range (3) is moved inside the scanning range (2). By moving inside the scanning range (2), searching and tracking can be performed.

The observation control device (40) according to the present disclosure may further comprise a search unit (47) that conducts a target search on a basis of information obtained by moving the observation range (3) to scan inside the scanning range (2).

According to the observation control device (40) according to the present disclosure, because the observation range (3) is moved to scan inside the scanning range (2), the scanning range (2) can be observed and a target search can be conducted.

The observation control device (40) according to the present disclosure may also be configured such that when the scanning of the observation range (3) from a start point to an end point in the scanning range (2) is completed, the search unit (47) conducts a target search by rescanning from a start point set inside the scanning range (2).

According to the observation control device (40) according to the present disclosure, because a rescan is performed from a start point set in the scanning range (2) when the scanning from a start point to an end point in the scanning range (2) is completed, an area inside the scanning range (2) can be observed multiple times, thereby improving the observation accuracy. The start point in the case of performing a rescan may be set to the same point as the start point before performing the rescan or to a new point inside the scanning range (2).

The observation control device (40) according to the present disclosure further comprises a tracking unit (48) that tracks a target on a basis of information obtained by moving the observation range (3) inside the scanning range (2).

According to the observation control device (40) according to the present disclosure, because the observation range (3) can be moved inside the scanning range (2), it is possible to track a target on the basis of information obtained by observation.

The observation control device (40) according to the present disclosure may further comprise a correction unit (46) that corrects a distortion in an image occurring due to a relaying of light by the reflecting means.

In the case of guiding light by reflecting the light off a reflective surface in a reflecting means, distortions such as a tilting of the image may occur in the guided light in some cases. For this reason, by correcting such distortions, the distortions can be reduced. The correction may be achieved mechanically in the reflecting means or by subjecting the detected signal to processing (for example, image processing) or the like.

The observation control device (40) according to the present disclosure may also be configured such that, after observation is performed in the observation range (3), at least one of the orthogonal direction control unit (42) and the travel direction control unit (41) moves the observation range (3) so as to be partially superimposed onto the observation range (3) where the observation has been performed.

According to the observation control device (40) according to the present disclosure, after observation is performed in the observation range (3), the observation range (3) is moved so as to be partially superimposed onto the observation range (3) where the observation has been performed, thereby creating an overlap range between the observation ranges (3) before and after the movement. For this reason, the occurrence of an unobserved range can be suppressed. Furthermore, missed observation of a target near the boundaries of the observation range (3) can be suppressed. In other words, it is possible to improve the observation certainty.

The observation control device (40) according to the present disclosure may also be configured such that the partially superimposed range before and after the movement of the observation range (3) is set on the basis of the velocity of the observation target.

According to the observation control device (40) according to the present disclosure, by setting the superimposed range (overlap range) on the basis of the speed of the observation target, it is possible to observe the observation target more reliably.

A spacecraft (1) according to the present disclosure comprises the above observation control device (40).

An observation method according to the present disclosure is an observation control method applicable to a detecting means (34) installed onboard a spacecraft (1) for performing observation, comprising: moving an observation range (3) in a direction orthogonal to a travel direction of the spacecraft (1), the observation range (3) being a range observed by the detecting means (34); and moving the observation range (3) in the travel direction of the spacecraft (1).

An observation program according to the present disclosure is an observation control program applicable to a detecting means (34) installed onboard a spacecraft (1) for performing observation, the program causing a computer to execute a process comprising: moving an observation range (3) in a direction orthogonal to a travel direction of the spacecraft (1), the observation range (3) being a range observed by the detecting means (34); and moving the observation range (3) in the travel direction of the spacecraft (1).

REFERENCE SIGNS LIST 1 artificial satellite (spacecraft)
2 scanning range
3 observation range
11 CPU
12 ROM
13 RAM
14 hard disk drive
15 communication unit
18 bus
31 mirror
32 gimbal
33 lens
34 detector (detecting means)
40 observation control device
41 travel direction control unit
42 orthogonal direction control unit
43 processing unit
44 detector driving unit
46 correction unit
47 search unit
18 tracking unit
E Earth
O orbit

The invention claimed is:

1. An observation control device applicable to a detector installed onboard a spacecraft for performing observation, the observation control device comprising:
   an orthogonal direction control unit configured to move an observation range in a direction orthogonal to a travel direction of the spacecraft, the observation range being a range observed by the detector; and
   a travel direction control unit configured to move the observation range in the travel direction of the spacecraft by controlling an angle of a reflective surface of a mirror configured to guide light from the observation range to the detector,
   wherein:
   the observation range is movable inside a scanning range having a first edge defined by a first distance in which the observation range is movable in the travel direction of the spacecraft and a second edge defined by a second distance in which the observation range is movable in the direction orthogonal to the travel direction of the spacecraft;

at least one of the orthogonal direction control unit or the travel direction control unit is configured to: (i) after the observation is performed in the observation range, move the observation range so as to be partially superimposed onto the observation range where the observation has been performed; and (ii) when a target is detected in a specific range of the scanning range, a partial range of the scanning range that contains a position where the target has been detected may be observed, move the observation range in association with a movement of the target such that a detection position of the target is positioned in a center of the observation range; and the observation control device is configured to correct a distortion in an image occurring due to a relaying of the light by the mirror.

2. The observation control device according to claim 1, wherein:

the reflective surface of the mirror is a first reflective surface of the mirror; and the travel direction control unit is configured to move the observation range in the travel direction of the spacecraft by controlling the angle of the first reflective surface of the mirror and an angle of a second reflective surface of the mirror.

3. The observation control device according to claim 1, wherein the orthogonal direction control unit is configured to control the angle of the reflective surface of the mirror to move the observation range in the direction orthogonal to the travel direction of the spacecraft.

4. The observation control device according to claim 1, wherein the observation control device is configured to conduct a search for the target based on information obtained by moving the observation range to scan inside the scanning range.

5. The observation control device according to claim 4, wherein the observation control device is configured to, when the scanning of the observation range from a start point to an end point in the scanning range is completed, conduct the search for the target by rescanning from a new start point set inside the scanning range.

6. The observation control device according to claim 1, wherein the observation control device is configured to track the target based on information obtained by moving the observation range inside the scanning range.

7. The observation control device according to claim 1, wherein the observation control device is configured to set the partially superimposed range before and after the movement of the observation range based on a velocity of the target.

8. A spacecraft comprising the observation control device according to claim 1.

9. An observation control method applicable to a detector installed onboard a spacecraft for performing observation, the observation control method comprising:

moving an observation range in a direction orthogonal to a travel direction of the spacecraft, the observation range being a range observed by the detector;

moving the observation range in the travel direction of the spacecraft by controlling an angle of a reflective surface of a mirror that guides light from the observation range to the detector; and correcting a distortion in an image occurring due to a relaying of the light by the mirror, wherein:

the observation range is movable inside a scanning range having a first edge defined by a first distance in which the observation range is movable in the travel direction of the spacecraft and a second edge defined by a second distance in which the observation range is movable in the direction orthogonal to the travel direction of the spacecraft;

after the observation is performed in the observation range, the observation range is moved in at least one of the travel direction of the spacecraft or the direction orthogonal to the travel direction of the spacecraft so as to be partially superimposed onto the observation range where the observation has been performed; and when a target is detected in a specific range of the scanning range, a partial range of the scanning range that contains a position where the target has been detected may be observed, the observation range is moved in association with a movement of the target such that a detection position of the target is positioned in a center of the observation range.

10. A non-transitory tangible computer-readable storage medium storing an observation control program applicable to a detector installed onboard a spacecraft for performing observation, the observation control program causing a computer to execute a process comprising:

moving an observation range in a direction orthogonal to a travel direction of the spacecraft, the observation range being a range observed by the detector;

moving the observation range in the travel direction of the spacecraft by controlling an angle of a reflective surface of a mirror that guides light from the observation range to the detector; and correcting a distortion in an image occurring due to a relaying of the light by the mirror, wherein:

the observation range is movable inside a scanning range having a first edge defined by a first distance in which the observation range is movable in the travel direction of the spacecraft and a second edge defined by a second distance in which the observation range is movable in the direction orthogonal to the travel direction of the spacecraft;

after the observation is performed in the observation range, the observation range is moved in at least one of the travel direction of the spacecraft or the direction orthogonal to the travel direction of the spacecraft so as to be partially superimposed onto the observation range where the observation has been performed; and when a target is detected in a specific range of the scanning range, a partial range of the scanning range that contains a position where the target has been detected may be observed, the observation range is moved in association with a movement of the target such that a detection position of the target is positioned in a center of the observation range.

11. The observation control method according to claim 9, further comprising:

conducting a search for the target based on information obtained by moving the observation range to scan inside the scanning range.

12. The observation control method according to claim 11, wherein
when the scanning of the observation range from a start point to an end point in the scanning range is completed, the search for the target is conducted by rescanning from a new start point set inside the scanning range.

13. The observation control method according to claim 9, further comprising:
tracking the target based on information obtained by moving the observation range inside the scanning range.

* * * * *